US011170799B2

(12) United States Patent
Lambrick

(10) Patent No.: US 11,170,799 B2
(45) Date of Patent: Nov. 9, 2021

(54) NONLINEAR NOISE REDUCTION SYSTEM

(71) Applicant: HARMAN INTERNATIONAL INDUSTRIES, INCORPORATED, Stamford, CT (US)

(72) Inventor: James Lambrick, Sandy, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 70 days.

(21) Appl. No.: 16/275,126

(22) Filed: Feb. 13, 2019

(65) Prior Publication Data

US 2020/0258537 A1   Aug. 13, 2020

(51) Int. Cl.
| | | |
|---|---|---|
| *G10L 21/0232* | (2013.01) | |
| *G10L 15/20* | (2006.01) | |
| *G10L 15/22* | (2006.01) | |
| *G10L 25/18* | (2013.01) | |
| *G10L 25/21* | (2013.01) | |
| *G10L 25/24* | (2013.01) | |

(52) U.S. Cl.
CPC .......... *G10L 21/0232* (2013.01); *G10L 15/20* (2013.01); *G10L 15/22* (2013.01); *G10L 25/18* (2013.01); *G10L 25/21* (2013.01); *G10L 25/24* (2013.01)

(58) Field of Classification Search
CPC ..... G10L 21/0232; G10L 15/20; G10L 15/22; G10L 25/18; G10L 25/21; G10L 25/24
USPC ......................................................... 704/226
See application file for complete search history.

(56) References Cited

U.S. PATENT DOCUMENTS

| | | | | |
|---|---|---|---|---|
| 5,133,013 | A * | 7/1992 | Munday | G10L 21/0208 704/226 |
| 5,774,844 | A * | 6/1998 | Akagiri | H04B 14/046 704/215 |
| 7,373,293 | B2 * | 5/2008 | Chang | G10L 19/032 704/200.1 |
| 10,148,912 | B1 * | 12/2018 | Oliver | H04L 12/1822 |

(Continued)

OTHER PUBLICATIONS

Diethorn, Eric J. "A subband noise-reduction method for enhancing speech in telephony and teleconferencing." Proceedings of 1997 Workshop on Applications of Signal Processing to Audio and Acoustics. IEEE, 1997.*

(Continued)

*Primary Examiner* — Edwin S Leland, III
(74) *Attorney, Agent, or Firm* — Artegis Law Group, LLP

(57) ABSTRACT

Embodiments of the present disclosure set forth a method of decomposing an audio signal into a set of sub-band signals and detecting a set of signal energy values, where each signal energy value is associated with a sub-band signal. The method also includes generating a noise reduction threshold based on at least one sub-band signal, and, for each sub-band signal, comparing the associated signal energy value to the noise reduction threshold. Based on determining that at least one sub-band signal is associated with a signal energy value below the noise reduction threshold, the method includes attenuating the at least one the sub-band signal to generate a set of attenuated sub-band signals. The method also includes combining at least one sub-band signal included in the set of sub-band signals with at least one attenuated sub-band signal included in the set of attenuated sub-band signals to generate an output audio signal.

20 Claims, 7 Drawing Sheets

(56) References Cited

U.S. PATENT DOCUMENTS

| | | | | |
|---|---|---|---|---|
| 2003/0144834 | A1* | 7/2003 | Macho | G10L 15/02 704/205 |
| 2004/0008904 | A1* | 1/2004 | Lin | G06T 5/10 382/275 |
| 2005/0253713 | A1* | 11/2005 | Yokota | G08B 13/1672 340/566 |
| 2011/0257967 | A1* | 10/2011 | Every | G10L 21/0232 704/226 |
| 2012/0123771 | A1* | 5/2012 | Chen | H04R 1/245 704/226 |
| 2012/0130711 | A1* | 5/2012 | Yamabe | G10L 25/78 704/231 |
| 2012/0185243 | A1* | 7/2012 | Fukuda | G10L 15/02 704/205 |
| 2013/0218559 | A1* | 8/2013 | Yamabe | G10L 21/0216 704/226 |
| 2013/0226572 | A1* | 8/2013 | Mason | G10L 21/0216 704/226 |
| 2014/0136195 | A1* | 5/2014 | Abdossalami | H04M 3/2236 704/235 |
| 2015/0016617 | A1* | 1/2015 | Jain | G10L 19/02 381/56 |
| 2016/0261749 | A1* | 9/2016 | Femal | G10L 25/78 |
| 2017/0076720 | A1* | 3/2017 | Gopalan | G10L 15/22 |
| 2017/0094464 | A1* | 3/2017 | Chu | H04B 11/00 |
| 2017/0125033 | A1* | 5/2017 | Kjems | G10L 21/0316 |
| 2018/0053364 | A1* | 2/2018 | Bhattacharya | G07C 9/00563 |
| 2019/0088257 | A1* | 3/2019 | Shah | G06F 3/167 |
| 2020/0258537 | A1* | 8/2020 | Lambrick | G10L 21/0232 |
| 2021/0104219 | A1* | 4/2021 | Hua | G10L 25/18 |

OTHER PUBLICATIONS

Extended European Search Report for application No. 20156605.6 dated Jul. 13, 2020.

Diethorn, Eric J., "A Subband Noise-Reduction Method for Enhancing Speech in Telephony & Teleconferencing", Applications of Signal Processing to Audio and Acoustics, IEEE ASSP Workshop on New Paltz, XP010248196, ISBN: 978-0-7803-3908-8, Oct. 19, 1997, 4 pages.

Final Office Action received for U.S. Appl. No. 16/151,996, dated Oct. 14, 2020, 32 pages.

* cited by examiner

NONLINEAR NOISE REDUCTION SYSTEM

BACKGROUND

Field of the Various Embodiments

Embodiments of the present disclosure relate generally to audio systems and, more specifically, to a nonlinear noise reduction system.

Description of the Related Art

Various automatic speech recognition (ASR) systems use several filtering and extraction techniques in order to identify components of an audio signal that the system can use to recognize linguistic content included in the audio signal. ASR systems extract features from the received audio signal by applying one or more filters to the audio signal. ASR systems then apply various models (e.g., an acoustic model, a language model, etc.) to the extracted features in order to determine candidate words that are likely to have been spoken. In general, the ASR system may employ noise reduction systems in order to remove environmental noise from the input audio signal, which increases accuracy when identifying candidate words from the input audio signal.

One drawback of employing conventional noise reduction systems in conjunction with automatic speech recognition techniques is that processing audio signals via a noise reduction system generally decreases the accuracy of identifying words included in the audio signal. For example, a processed audio signal produced through conventional noise reduction techniques could include processing artifacts, which could cause the ASR system to present "false positive" candidate words. Additionally or alternatively, a processed audio signal could have portions of the audio spectrum removed. The removal of portions of the audio spectrum could prevent the ASR system from identifying applicable portions of the processed audio signal as speech. In both instances, the ASR system is unable to accurately identify words included in the processed audio signal.

In light of the above, more effective techniques for reducing noise in an audio signal processed by a voice recognition system would be useful.

SUMMARY

Embodiments of the present disclosure set forth a method for reducing noise in an audio signal. The method includes decomposing a first input audio signal into a first set of sub-band signals, and detecting a first set of signal energy values, where each signal energy value included in the first set of signal energy values is associated with a sub-band signal included in the first set of sub-band signals. The method also includes generating a first noise reduction threshold based on at least one sub-band signal included in the first set of sub-band signals. The method also includes, for each sub-band signal included in the first set of sub-band signals, comparing the signal energy value associated with the sub-band signal to the first noise reduction threshold. Based on determining that at least one sub-band signal included in the first set of sub-band signals is associated with a signal energy value that is below the first noise reduction threshold, the method also includes attenuating the at least one sub-band signal to generate a first set of attenuated sub-band signals. The method also includes combining at least one sub-band signal included in the first set of sub-band signals with at least one attenuated sub-band signal included in the first set of attenuated sub-band signals to generate an output audio signal.

Further embodiments provide, among other things, a system and computer-readable storage medium for implementing aspects of the methods set forth above.

At least one technological advantage of the disclosed techniques is that the noise reduction system can reduce noise elements included in an audio signal using the one or more filters that are also used by other audio processing systems. The noise reduction system can thus effectively remove noise elements from the audio signal such that other audio processing systems can more efficiently process the audio signal without degrading other portions of the audio signal.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
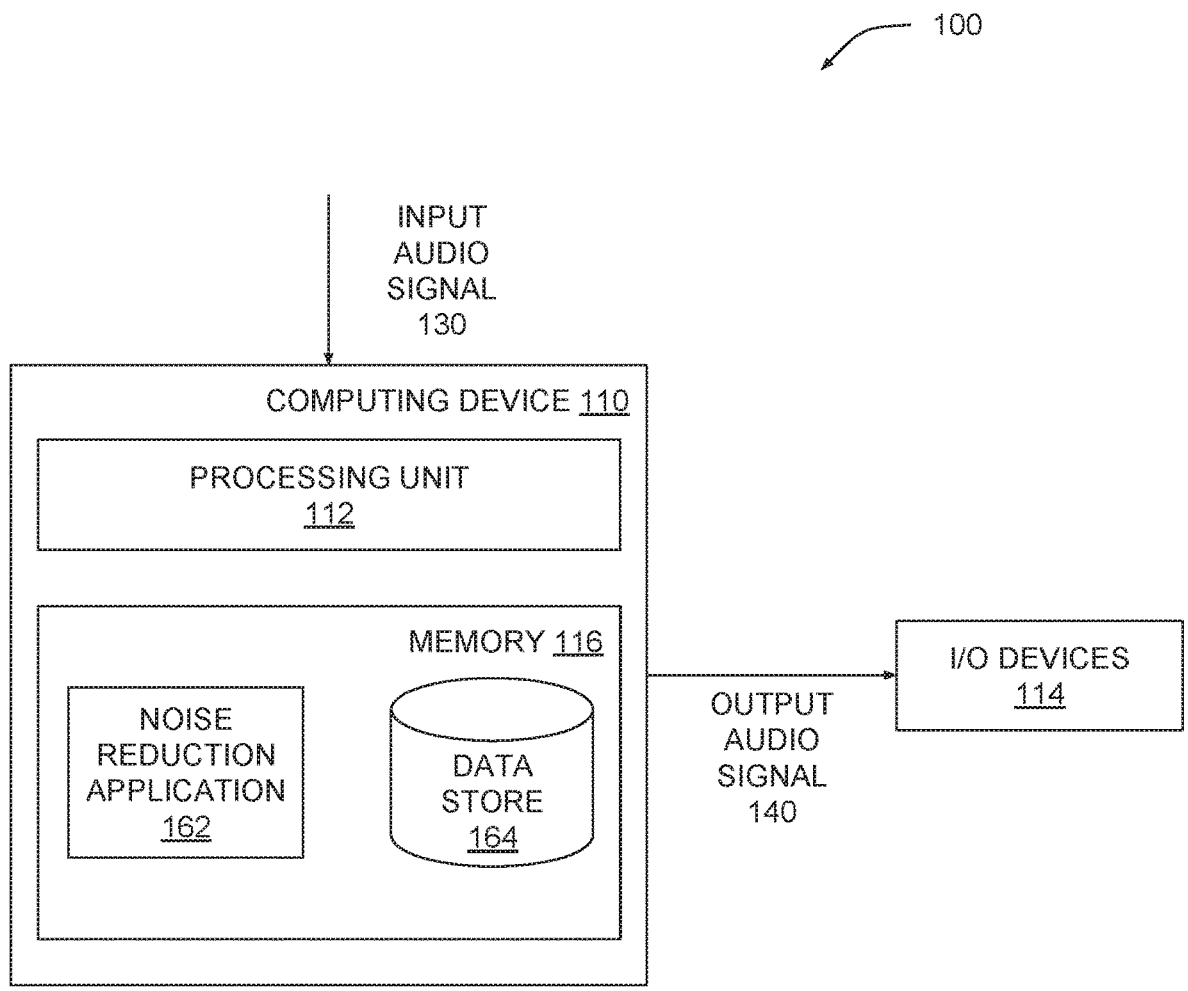
FIG. 1 illustrates a block diagram of a noise reduction system configured to implement one or more aspects of the present disclosure.

FIG. 1 illustrates a block diagram of a noise reduction system configured to implement one or more aspects of the present disclosure. Noise reduction system 100 includes computing device 110, and one or more input/output (I/O)

devices 114. Computing device 110 includes processing unit 112 and memory 116. Memory 116 stores noise reduction application 162 and data store 164.

In operation, processing unit 112 receives input audio signal 130. Processing unit 112 executes noise reduction application 162 to remove noise elements included in input audio signal 130 and synthesize output audio signal 140. For example, noise reduction application 162 could use a filter bank to decompose a portion of input audio signal 130 into a set of filtered signals. The set of filtered signals comprises a set of sub-band signals associated with one or more components of input audio signal 130. Noise reduction application 162 could then analyze the set of filtered signals and attenuate a subset of filtered signals that have noise elements. When noise reduction application 162 synthesizes output audio signal 140 that includes the subset of attenuated filtered signals, noise elements are reduced and/or or eliminated in output audio signal 140. In some embodiments, the filter bank may correspond to a filter bank used by one or more speech recognition systems. In such instances, one or more speech elements included in input audio signal 130 may be included in output audio signal 140 without significant alteration and/or attenuation.

As noted above, computing device 110 can include processing unit 112 and memory 116. Computing device 110 can be a device that includes one or more processing units 112, such as a system-on-a-chip (SoC), or a mobile computing device, such as a tablet computer, mobile phone, media player, and so forth. Generally, computing device 110 can be configured to coordinate the overall operation of noise reduction system 100. The embodiments disclosed herein contemplate any technically-feasible system configured to implement the functionality of noise reduction system 100 via computing device 110.

Memory 116 can include a memory module or collection of memory modules. Noise reduction application 162 within memory 116 can be executed by processing unit 112 to implement the overall functionality of the computing device 110 and, thus, to coordinate the operation of the noise reduction system 100 as a whole.

Processing unit 112 may include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and so forth. In some embodiments, processing unit 112 can be configured to execute noise reduction application 162 in order to synthesize output audio signal 140 with one or more noise elements removed.

In various embodiments, noise reduction application 162 may decompose input audio signal into a set of filtered signals. Noise reduction application 162 can analyze the signal energy associated with each filtered signal and adjust a noise threshold based on the detected signal energies. Noise reduction application 162 may then attenuate a subset of filtered signals that have signal energies below the adjusted noise threshold. This subset of filtered signals has signal energy associated with noise elements. When noise reduction application 162 synthesizes output audio signal 140, the noise elements are removed due to the attenuation. In some embodiments, noise reduction application 162 may continually receive and process input audio signal 130. For example noise reduction application 162 may receive input audio signal 130 in real time and process input audio signal in real time. In such instances, noise reduction application 162 may separate input audio signal 130 into separate time slices and process one or more time slices of input audio signal 130 continually.

Data store 164 can store values and other data retrieved by processing unit 112 to coordinate the operation of noise reduction system 100. During operation, processing unit 112 can be configured to store values in data store 164 and/or retrieve values stored in data store 164. For example, data store 164 could store noise thresholds, detected energy values, filtered signals, attenuated filtered signals, energy differences, threshold indicators, and so forth.

I/O device(s) 114 may include devices capable of receiving input, such as a keyboard, a mouse, a touch-sensitive screen, a microphone and so forth, as well as devices capable of providing output, such as a display screen, loudspeakers, and the like. One or more of I/O devices 114 can be incorporated in computing device 110, or may be external to computing device 110. In various embodiments, I/O device(s) 114 includes an audio output device that reproduces output audio signal 140 received from noise reduction application 162.

In some embodiments, I/O device 114 may transmit output audio signal 140 to another system. For example, I/O device 114 may transmit output audio signal 140 to a filter bank used by a secondary system, such as an automatic speech recognition (ASR) system, an equalization system, and/or audio compression system. In such instances, the secondary system can process output audio signal 140 more efficiently and/or with more accuracy due to the noise elements being removed.

Figure 2:
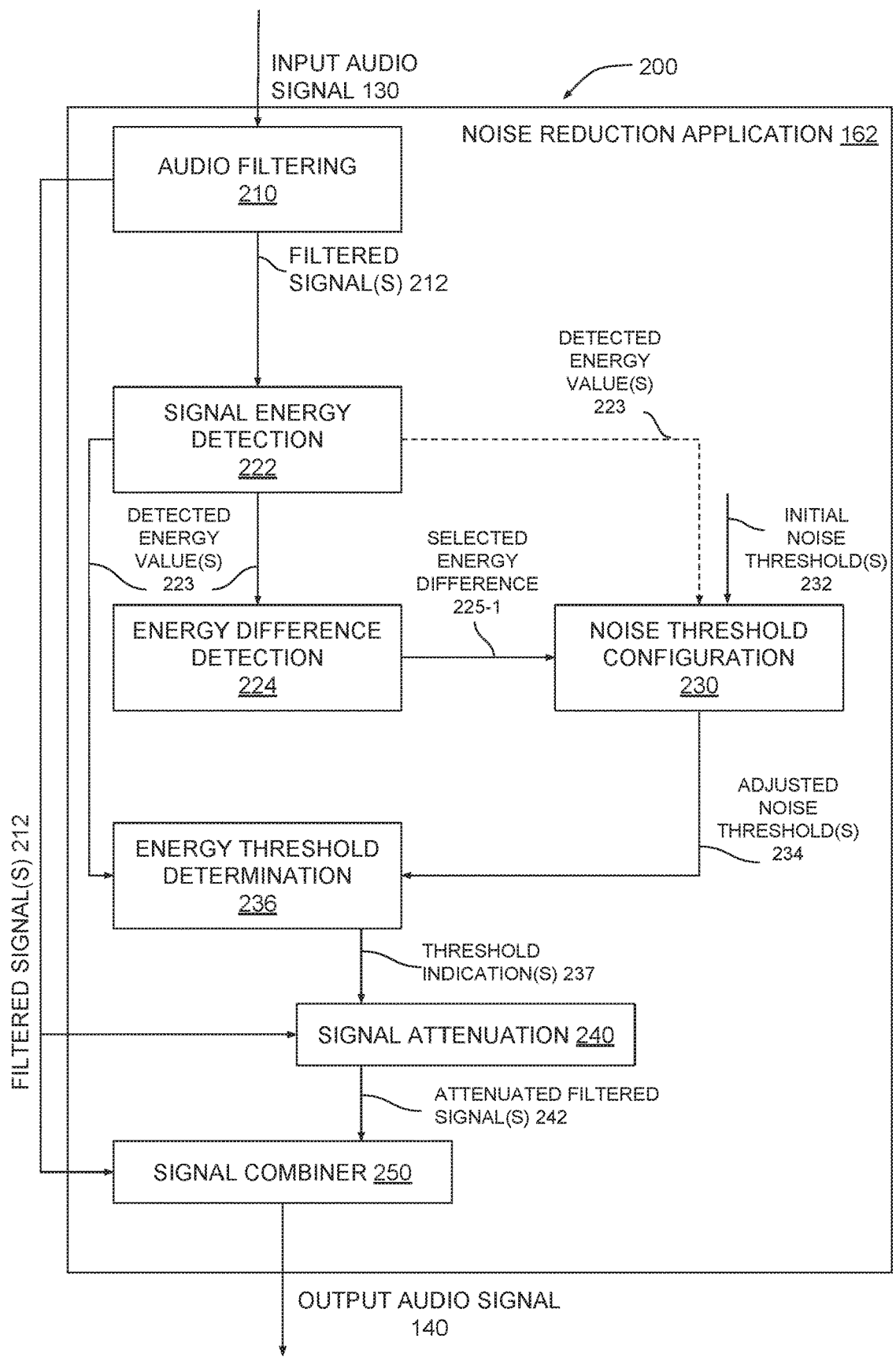
FIG. 2 illustrates a block diagram of the noise reduction application for producing a composite output audio signal via the noise reduction system of FIG. 1, according to various embodiments of the present disclosure.

FIG. 2 illustrates a block diagram of noise reduction application 162 for producing a composite output audio signal via the noise reduction system of FIG. 1, according to various embodiments of the present disclosure. As shown, noise reduction application 162 includes audio filtering component 210, signal energy detection component 222, energy difference detection component 224, noise threshold configuration component 230, energy threshold determination component 236, signal attenuation component 240, and signal combiner component 250.

During operation, noise reduction application 162 receives input audio signal 130. Input audio signal 130 includes one or more speech elements and one or more noise elements. Noise reduction application 162 analyzes input audio signal 130 and synthesizes output audio signal 140. Output audio signal 140 has the one or more noise elements removed and/or attenuated. Noise reduction application 162 includes hardware and/or software to compute energy values associated with the speech portions of input audio signal 130 and synthesize output audio signal 140 based on the computed energy values.

Audio filtering component 210 includes a front-end for noise reduction system 100. Audio filtering component 210 receives and decomposes input audio signal 130 to produce a set of filtered signals 212 (e.g., 212-1, 212-2, etc.). The set of filtered signals 212 comprises a set of sub-band signals associated with components of input audio signal 130. In some embodiments, audio filtering component 210 may include one or more analog-to-digital (A/D) converters, one or more transforms, and a bank of two or more filters. For example, input audio signal 130 could be a time-domain signal. In such instances, one or more transforms included in audio filtering component 210 could convert input audio signal 130 into a frequency-domain signal. Additionally or alternatively, when input audio signal 130 is an analog signal, one or more A/D converters may convert input audio signal 130 into a digital signal. In some embodiments, input audio signal 130 may be a continuous audio signal. In such instances, noise reduction application 162 may receive portions of input audio signal 130 that correspond to specific time slice. For example, noise reduction application 162 could continually receive two-second time slices of input audio signal 130. Noise reduction application 162 could then synthesize output audio signal 140 as a series of audio signals that each have a fixed duration (e.g., two seconds in length).

Audio filtering component 210 includes a filter bank that decomposes input audio signal 130 into a set of filtered signals 212. The set of filtered signals 212 comprises a set of sub-band signals associated with components of input audio signal 130. For example, audio filtering component 210 could include a filter bank of three filters. The filter bank could decompose input audio signal 130 into a set of filtered signals 212-1, 212-2, 212-3, corresponding to the frequency sub-bands of input audio signal 130. For example, the filter bank can include a set number of n-th order filters, such as a set of 20 fourth-order bandpass filters.

Additionally or alternatively, the set of filters included in filter bank may correspond to a set of filters used by one or more other audio processing systems. For example, the filter bank included in audio filtering component 210 could correspond to a filter bank used by an automatic speech recognition system, an equalization system, and/or audio compression system. When the filter bank included in audio filtering component 210 corresponds to a filter bank used by another system, audio filtering component 210 may retrieve filter operating characteristics (e.g., center frequency, gain, Q factor, etc.) from the one or more other systems. For example, when the ASR system and noise reduction system 100 each use a mel filter bank, noise reduction application 162 could retrieve filter characteristics, such as mel-frequency cepstral coefficients (MFCCs) that define the frequency ranges of the respective filters, from the ASR system. Noise reduction application 162 could then configure the filter bank to include the retrieved characteristics.

Signal energy detection component 222 computes a signal energy value for each filtered signal 212-1 included in the set of filtered signals 212. Signal energy detection component 222 receives the set of filtered signals 212 from audio filtering component 210 and determines a corresponding set of detected energy values 223 (e.g., 223-1, 223-2, etc.). For example, signal energy detection component 222 could receive filtered signal 212-1 for a given time splice and compute a signal energy value, such an average power. In another example, signal energy detection component 222 could compute the root-mean-square (RMS) value for filtered signal 212-1 within the given time slice.

In some embodiments, signal energy detection component 222 may use differing time constants for different frequency ranges. For example, signal energy detection component 222 could use a different time constant associated with each filter in the filter bank of audio filtering component 210. Additionally or alternatively, signal energy detection component 222 may detect multiple energy values 223 for a filtered signal 212-1. For example, signal energy detection component 222 could continually compute multiple RMS values for filtered signal 212-1 for varying time ranges. In such instances, signal energy detection component 222 stores the lowest RMS value and sends the lowest RMS value as detected energy value 223-1 to energy difference detection component 224.

Energy difference detection component 224 receives the set of detected energy values 223 from signal energy detection component 222 and generates one or more energy differences 225 (e.g., 225-1, 225-2, etc.) based on comparing the set of detected energy values 223. For example, energy difference detection component 224 can compute energy difference 225-1 by comparing detected energy value 223-1, corresponding to filtered signal 212-1, and detected energy value 223-2, corresponding to filtered signal 212-2. Additionally or alternatively, energy difference detection component 224 may select a single energy difference 225-1 from the set of energy differences 225 and transmit selected energy difference 225-1 to noise threshold configuration component 230.

In various embodiments, energy difference detection component 224 may compute multiple energy differences 225, where each energy difference 225-1 corresponds to a pair of neighboring filtered signals 212-1, 212-2. In such instances, energy difference detection component 224 may determine the largest computed energy difference from the set of computed energy differences 225 to be selected energy difference 225-1. For example, Table 1 shows an example set of energy differences 225 corresponding to a set of filtered signals 212 decomposed by a filter bank included in audio filtering component 210.

TABLE 1

Energy Differences for Signals in Neighboring Filters

| Filter | Signal Energy Value | Signal Energy Value Difference |
|---|---|---|
| Filter 1 | 0.803 | N/A |
| Filter 2 | 0.720 | 0.083 |
| Filter 3 | 0.105 | 0.615 |
| Filter 4 | 0.630 | 0.525 |
| Filter 5 | 0.422 | 0.208 |

In the example above, energy difference detection component 224 could determine the largest signal energy value difference (0.615) as selected energy difference 225-1. Energy difference detection component 224 could transmit selected energy difference 225-1 to noise threshold configuration component 230.

Noise threshold configuration component 230 receives selected energy difference 225-1 from energy difference detection component 224. Noise threshold configuration component 230 also receives initial noise threshold 232. Noise threshold configuration component 230 generates adjusted noise threshold 234 by modifying initial noise threshold 232 based on the value of selected energy difference 225-1. For example, noise threshold configuration component 230 could multiply the absolute value of selected energy difference 225-1 by a scaling factor to produce a scaled difference. Noise threshold configuration component 230 could then add the scaled difference to initial noise threshold 232. In such instances, the value of adjusted noise threshold 234 is raised based on the set of computed energy differences associated with the set of filtered signals 212.

In some embodiments, noise threshold configuration component 230 may set one or more initial noise thresholds 232. For example, noise threshold configuration component 230 could set distinct initial noise thresholds 232 (e.g., 232-1, 232-2, etc.) that each correspond to a particular filter in the filter bank and a particular filtered signal 212-1. In such instances, noise threshold configuration component 230 could receive a minimum energy value 233-1 associated with each particular filter and/or the set of filtered signals 212. Noise threshold configuration component 230 could then set distinct initial noise thresholds 232. For each distinct initial noise threshold 232, noise threshold configuration component 230 generates adjusted noise threshold 234 by adding a scaled difference that is based on selected energy difference 225-1.

Energy threshold determination component 236 receives adjusted noise threshold 234 and the set of detected energy values 223 computed by signal energy detection component 222. Energy threshold determination component 236 evaluates a detected energy value 223-1 included in the set of detected energy values 223 against adjusted noise threshold 234. In some embodiments, energy threshold determination component 236 compares the detected energy value 223-1 against an adjusted noise threshold 234-1 corresponding to the filtered signal 212-1.

When energy threshold determination component 236 determines that detected energy value 223-1 is below adjusted noise threshold 234, energy threshold determination component 236 generates threshold indication 237 that corresponds to the filtered signal 212-1. Otherwise, energy threshold determination component 236 does not generate any threshold indication corresponding to the filtered signal 212-1. In such instances, noise reduction application 162 does not alter the filtered signal 212-1.

Signal attenuation component 240 includes one or more filters that alter a subset of filtered signals included in the set of filtered signals 212. Signal attenuation component 240 receives one or more threshold indications 237 (e.g., 237-1, 237-2, etc.), where each threshold indication 237-2 corresponds to a particular filtered signal 212-2. Threshold indication 237-2 for a particular filtered signal 212-2 indicates that filtered signal 212-2 has a detected energy value 233-2 below adjusted noise threshold 234. Signal attenuation component 240 responds to the threshold indication 237-2 for the given filtered signal 212-2 by altering filtered signal 212-2. Signal attenuation component 240 generates a set of attenuated filtered signals 242 that are attenuated sub-band signals associated with components of input audio signal 130.

In some embodiments, signal attenuation component 240 may attenuate filtered signal 212-2 by applying a filter to the signal in order to reduce the energy of filtered signal 212-2. Additionally or alternatively, signal attenuation component 240 may apply an attenuation factor to the filtered signal. For example, signal attenuation component 240 could multiply filtered signal 212-2 by zero so that the resultant attenuated filtered signal 242 has negligible energy. In another example, signal attenuation component 240 could multiply filtered signal by a specific constant (e.g., 0.25) to lower the energy level of filtered signal 212-2 by a constant value.

Signal combiner component 250 combines the set filtered signals 212, 242. Signal combiner component 250 includes a filter bank that synthesizes a set of signals 212, 242 in order to generate output audio signal 140. In some embodiments, signal combiner component 250 includes the same filter bank as the filter bank included in audio filtering component 210. Signal combiner component 250 receives a subset of unaltered filtered signals 212 from audio filtering component 210, and a subset of attenuated filtered signals 242 (e.g., 242-1, 242-2, etc.) from signal attenuation component 240. Signal combiner component 250 combines the subsets of filtered signals 212, 242 in order to synthesize output audio signal 140. For example, signal combiner component 250 can combine the individual filtered signals included in the subset of unaltered filtered signals 212 and/or the subset of attenuated filtered signals 242 for a given time slice such that output audio signal 140 includes the complete audio spectrum for a given time slice.

In some embodiments, one or more of the filtered signals included in subsets 212, 242 have overlapping frequency ranges. In such instances, signal combiner component 250 may, for a specific overlapping frequency range, select the filtered signal 212-1, 242-2 that has the highest detected energy value 233-1, 233-2. Additionally or alternatively, signal combiner component 250 may select unaltered filtered signal 212-1 in lieu of attenuated filtered signal 242-2.

Figure 3:
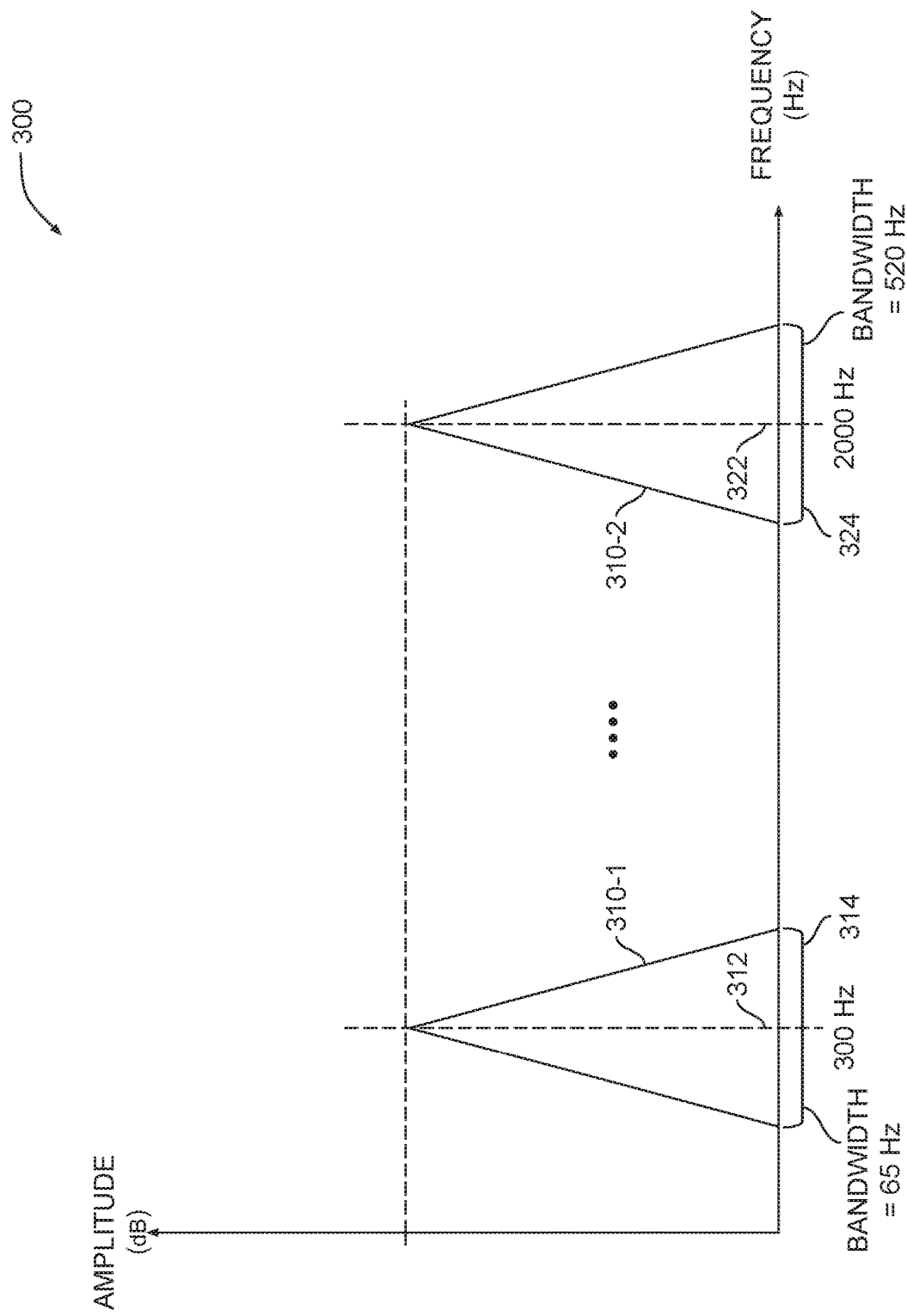
FIG. 3 illustrates a graph that may be implemented by the noise reduction system of FIG. 1 to filter an input audio signal, according to various embodiments of the present disclosure.

FIG. 3 illustrates a graph that may be implemented by the noise reduction system of FIG. 1 to filter an input audio signal, according to various embodiments of the present disclosure. As shown, graph 300 shows an amplitude plot for a mel filter bank 310 (e.g., 310-1, 310-2, etc.). Frequency values are along the x-axis and amplitude values are along the y-axis.

In operation, the filters 310-1, 310-2 included in mel filter bank 310 decomposes and filter input audio signal 130 in order to produce the set of filtered signals 212. In various embodiments, mel filter bank 310 is included in audio filtering component 210. For example, filter bank 310 could comprise a set of 21 or more mel filters that handle a portion of input audio signal 130 within the frequency range of 60 Hz to 8 kHz. Additionally or alternatively, one or more of the filters included in mel filter bank 310 may overlap. In such instances, both filters may process and filter an overlapping frequency range of input audio signal 130. In some embodiments, other sets of filters can be used as the filter bank for audio filtering component 210. For example, audio filtering component 210 could use a Bark filter bank comprising a set of 30 Bark filters that handle the frequency range of 0 Hz to 16 kHz. In some Graph 300 illustrates two mel filters 310-1, 310-2 included in mel filter bank 310. Each mel filter 310-1, 310-2 in mel filter bank 310 processes a specific frequency range of input audio signal 130 corresponding to bandwidths 314, 324. In various embodiments, each mel filter 310-1, 310-2 may have a distinct bandwidth. For example, a mel filter 310-2 that process higher frequencies may have a larger bandwidth 324 than the bandwidth 314 of mel filter 310-1, which processes lower frequencies. As shown, mel filter 310-1 has a center frequency 312 of 300 Hz and a bandwidth 314 of 65 Hz. Accordingly, mel filter 310-1 processes portions of input audio signal 130 that are within the 267-333 Hz frequency range. Similarly, mel filter 310-2 has a center frequency 322 of 2000 Hz and a bandwidth 324 of 520 Hz. Accordingly, mel filter 310-2 processes portions of input audio signal 130 that are within the 1478-2260 Hz frequency range.

In various embodiments, mel filter bank 310 may also be used by other systems in addition to noise reduction system 100. For example, an automatic speech recognition system may use mel filter bank 310 on input audio signal 130 and/or output audio signal 140 in order to extract features from audio signal being filtered.

Figure 4:
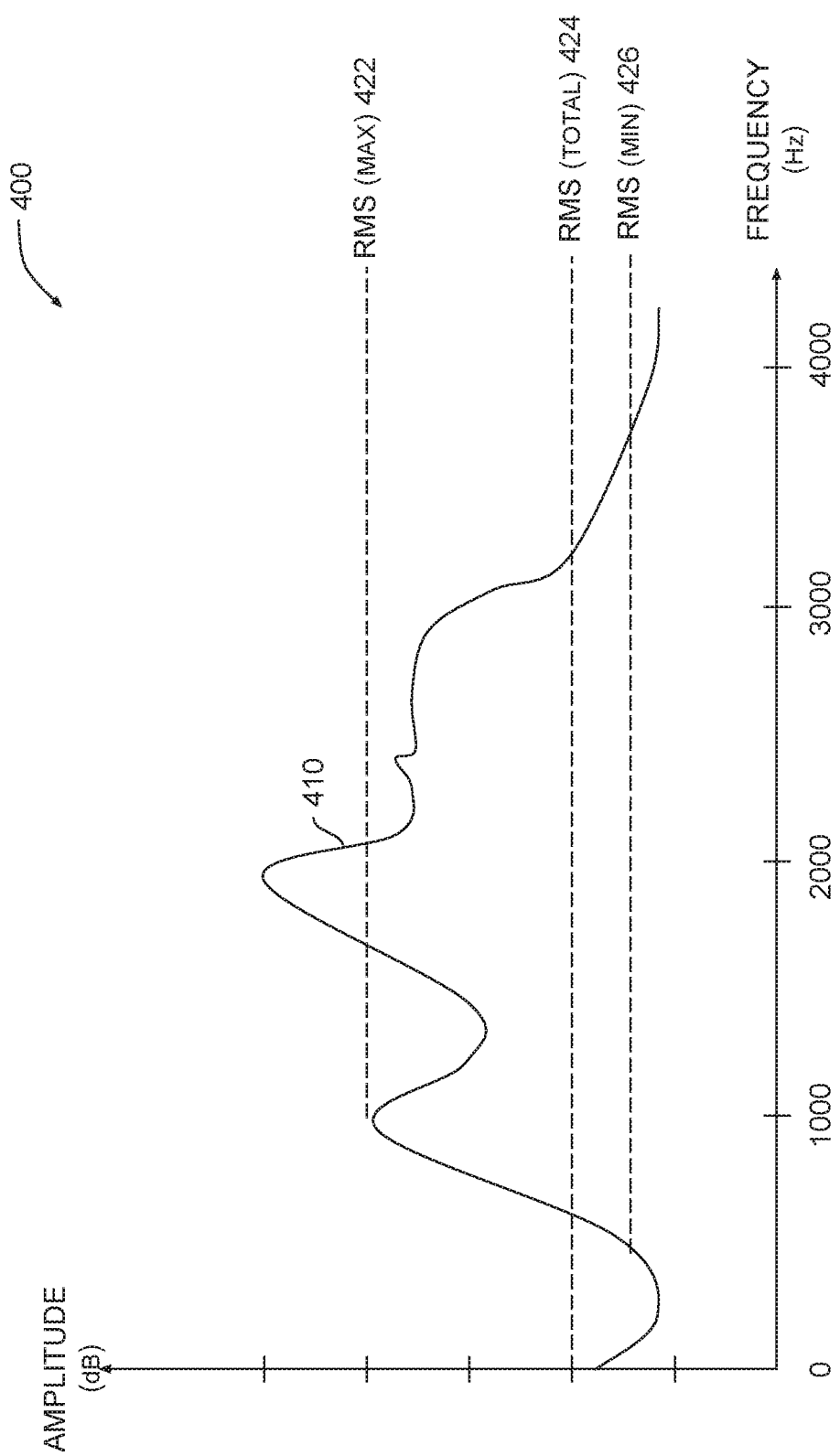
FIG. 4 illustrates a graph that may be implemented by the noise reduction system of FIG. 1 to determine the energy of a portion of a filtered audio signal, according to various embodiments of the present disclosure.

FIG. 4 illustrates a graph that may be implemented by the noise reduction system of FIG. 1 to determine the energy of a portion of a filtered audio signal, according to various embodiments of the present disclosure. As shown, graph 400 shows an amplitude plot for a filtered signal 410 included in the set of filtered signals 212. Frequency values are along the x-axis and amplitude values are along the y-axis.

In operation, signal energy detection component 222 receives filtered signal 410 from audio filtering component 210 and determines one or more signal energy values 422-426. In various embodiments, signal energy detection component 222 may determine multiple signal energy values 422-426 associated with filtered signal 410. Each of the signal energy values 422-426 may correspond to a different time range. For example, signal energy detection component 222 may compute a running signal energy value as more of input audio signal 130 is received over time.

Signal energy detection component 222 may store specific signal energy values, such as a minimum signal energy value 426, a maximum signal energy value 422, and/or a total average signal energy value 424, in association with filtered signal 410. In some embodiments, signal energy detection component 222 may update one or more of the signal energy values 422-426 as the time range associated with filtered signal 410 varies. Additionally or alternatively, signal energy detection component 222 may transmit one or more of the signal energy values 422-426 as detected energy values 223. For example, signal energy detection component 222 may transmit minimum energy value 426 to energy different detection component 224 and may transmit maximum signal energy value 422 and/or a total average signal energy value 424 to energy threshold determination component 236.

Figure 5:
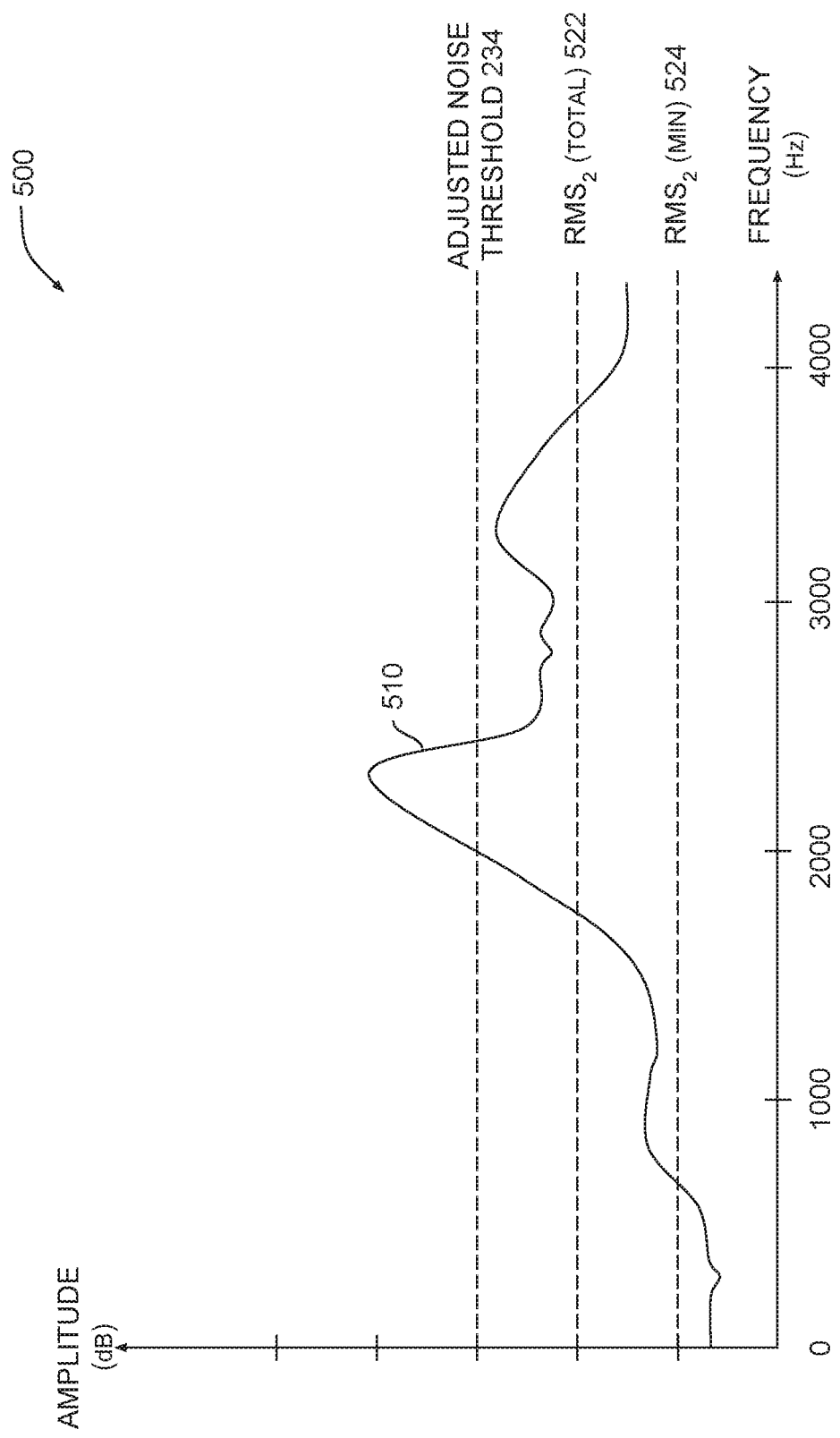
FIG. 5 illustrates a graph that may be implemented by the noise reduction system of FIG. 1 for attenuating a filtered audio signal, according to various embodiments of the present disclosure.

FIG. 5 illustrates a graph that may be implemented by the noise reduction system of FIG. 1 for attenuating a filtered audio signal, according to various embodiments of the present disclosure. As shown, graph 300 shows an amplitude plot for filtered signal 510 compared to adjusted noise threshold 234. Frequency values are along the x-axis and amplitude values are along the y-axis.

In operation, energy threshold determination component 236 may compare one or more signal energy values associated with filtered signal 510, to adjusted noise threshold 234. In some embodiments, adjusted noise threshold 234 may be a distinct adjusted noise threshold 234-2 associated with filtered signal 510. For example, noise threshold configuration component 230 may generate adjusted noise threshold 234-2 by first generating an initial noise threshold 232-2 that is based on minimum energy value 524.

Energy threshold determination component 236 compares the signal energy value of filtered signal against adjusted noise threshold 234. For example, energy threshold determination component 236 could compare the total average signal energy value 522 against adjusted noise threshold 234. As shown, total average signal energy value 522 is below adjusted noise threshold 234. In this instance, energy threshold determination component 236 responds to the determination by generating a threshold indication 237-2 and transmitting the threshold indication 237-2 to signal attenuation component 240.

Figure 6:
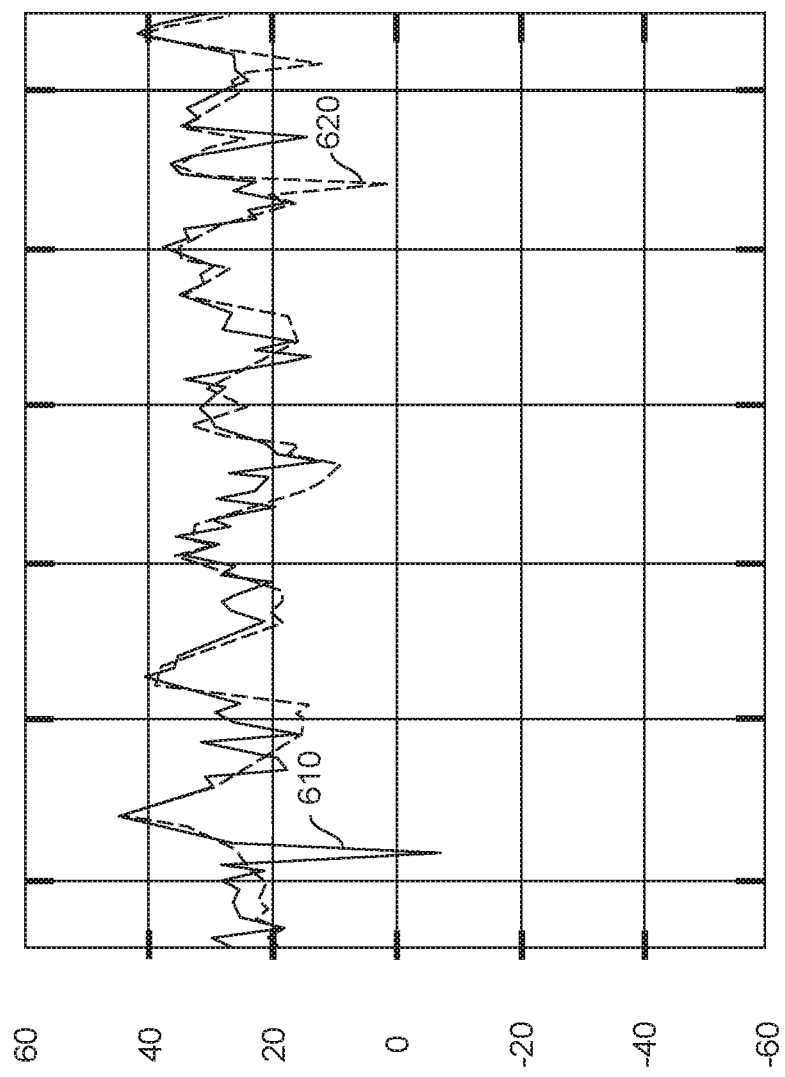
FIG. 6 illustrates a graph that may be implemented by the noise reduction system of FIG. 1 for generating a composite output audio signal, according to various embodiments of the present disclosure.

FIG. 6 illustrates a graph that may be implemented by the noise reduction system of FIG. 1 for generating a composite output audio signal, according to various embodiments of the present disclosure. As shown, graph 600 shows amplitude plots for a portion 610 ("input portion 610") of input audio signal 130 and corresponding portion 620 ("output portion 620") of output audio signal 140 for a given time slice. Frequency values are along the x-axis and amplitude values are along the y-axis.

In operation, noise reduction application 162 produces output portion 620 by analyzing input portion 610 and reducing one or more noise elements that were included in input portion 610. In various embodiments, signal combiner component 250 synthesizes output audio signal 140 by receiving a set of attenuated filtered signals 242 and a set of unaltered signals from the set of filtered signals 212. Signal combiner component 250 includes a filter bank that synthesizes a set of signals 212, 242 in order to generate output audio signal 140.

As shown, for example, input portion 610 includes one or more sub-bands corresponding to one or more filtered signals included in the set of filtered signals 212. The one or more sub-bands could include various noise elements. Energy threshold determination component 236 could compare input portion 610 to adjusted noise threshold 234 and cause signal attenuation component 240 to attenuate a subset of one or more sub-bands in order to generates the set of attenuated filtered signals 242. Signal combiner component 250 may then synthesize the set of attenuated filtered signals 242 and a subset of unaltered filtered signals 212 in order to generate output portion 620. Due to the attenuation of certain sub-bands, one or more noise elements that were included in the spectrum of input portion 610 are not present in the spectrum of output portion 620.

Figure 7:
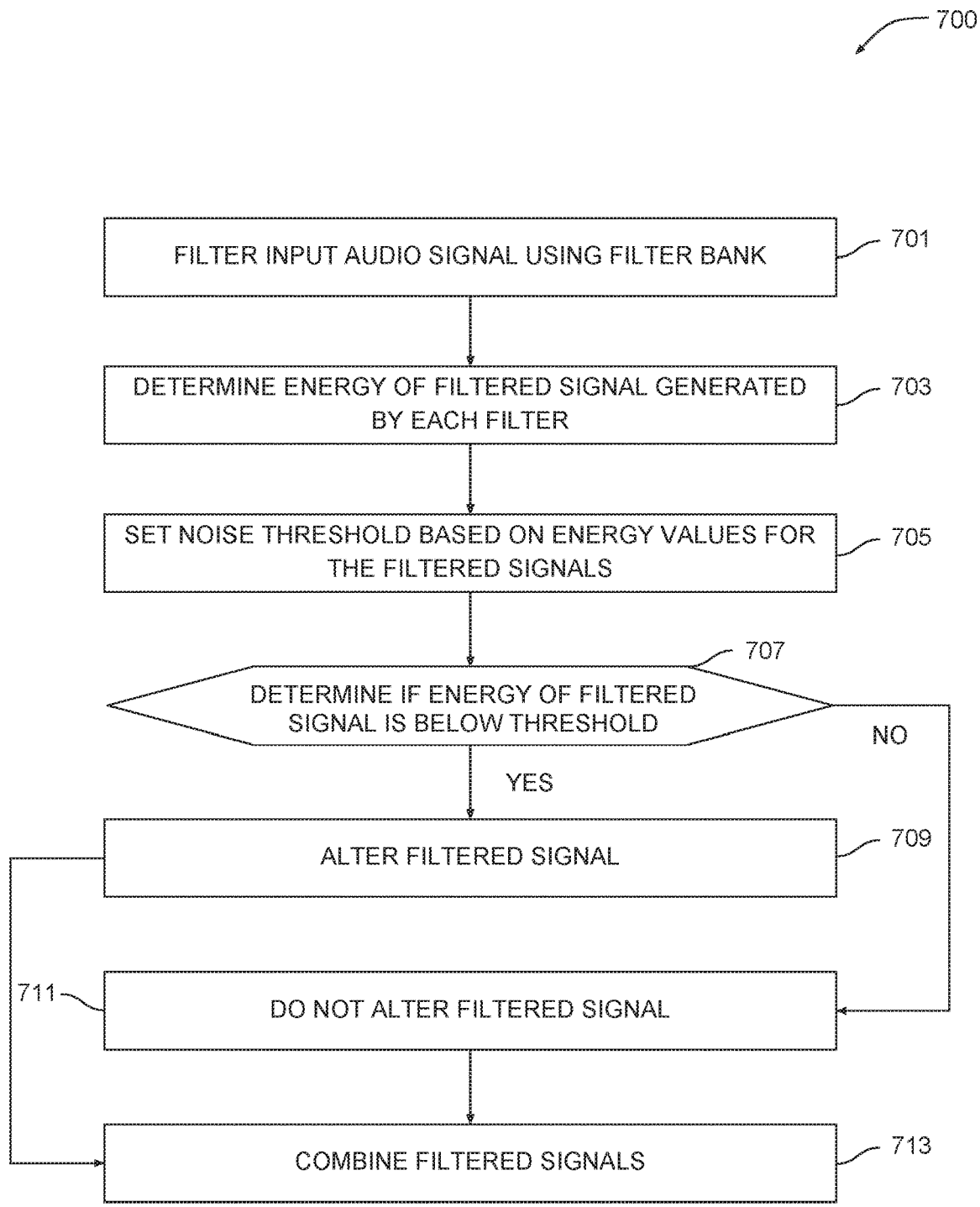
FIG. 7 is a flow diagram of method steps for generating a composite output audio signal via the noise reduction system of FIG. 1, according to various embodiments of the present disclosure.

FIG. 7 is a flow diagram of method steps for generating a composite output audio signal via the noise reduction system of FIG. 1, according to various embodiments of the present disclosure. Although the method steps are described with respect to the systems of FIGS. 1-6, persons skilled in the art will understand that any system configured to perform the method steps, in any order, falls within the scope of the various embodiments. In some embodiments, noise reduction application 162 may continually execute method 700 on input audio signal 130 in real-time.

As shown, method 700 begins at step 701, where noise reduction application 162 filters input audio signal 130 using a filter bank. Audio filtering component 210 included in noise reduction application 162 receives input audio signal 130. In some embodiments, input audio signal 130 is a portion of the input audio signal that corresponds to a particular time slice. Additionally or alternatively, noise reduction application 162 may continually receive and filter portions of the input audio signal that correspond to additional time slices. In some embodiments, audio filtering component 210 includes one or more transform components to generate a frequency-domain version of input audio signal 130. Audio filtering component 210 includes one or more filters that decompose input audio signal 130 into a set of filtered signals 212. In some embodiments, audio filtering component 210 includes mel filter bank 310, where each mel filter 310-1 in mel filter bank 310 processes a specific frequency range of input audio signal 130.

At step 703, noise reduction application 162 determines energy values 223 for the set of filtered signals 212 generated by audio filtering component 210. Signal energy detection component 222 included in noise reduction application 162 receives the set of filtered signals 212 from audio filtering component 210. For each filtered signal 212-1, signal energy detection component 222 determines a corresponding detected energy value 223-1. For example, signal energy detection component 222 could compute a RMS value for the signal energy of filtered signal 212-1 as detected energy value 223-1.

At step 705, noise reduction application 162 sets a noise threshold based on energy values for the filtered signal. Noise reduction application 162 generates one or more adjusted noise thresholds 234 based on the set of detected energy values 223 provided by signal energy detection component 222. In some embodiments, noise reduction application computes one or more initial noise thresholds 232 for the set of filtered signals 212. In various embodiments, noise reduction application 162 computes a set of energy differences 225 associated with the set of detected energy values 223. Noise reduction application 162 then uses at least a selected energy difference 225-1 in order to generate adjusted noise threshold 234.

Energy difference detection component 224 included in noise reduction application 162 receives the set of detected energy values 223 and generates a set of energy differences 225. For example, energy difference detection component 224 can compute an energy difference 225-2 by comparing a first detected energy value 223-1, corresponding to filtered signal 212-1, and a second detected energy value 223-2, corresponding to filtered signal 212-2. In some embodiments, energy difference detection component 224 can compute the set of energy differences 225 based on comparing sets of detected energy values 223 associated with neighboring filtered signals 212 (e.g., by comparing filtered signals 212-3, 212-4 produced by neighboring filters in the filter bank). In such instances, energy difference detection component 224 could output a selected energy difference 225-1 that corresponds to the largest computed energy difference 225-3 in the set of energy differences 225.

Noise threshold configuration component 230 receives selected energy difference 225-1 and initial noise threshold 232. Noise threshold configuration component 230 generates adjusted noise threshold 234 by modifying initial noise threshold 232 based on the value of selected energy difference 225-1. For example, noise threshold configuration component 230 could multiply selected energy difference 225-1 by a scaling factor to generate a scaled difference, and then add the scaled difference to initial noise threshold 232. In some embodiments, noise threshold configuration component 230 may generate a set of initial noise threshold 232. In such instances, noise threshold configuration component 230 may generate a set of adjusted noise thresholds 234 that each correspond to a separate initial noise threshold 232.

At step 707, noise reduction application 162 determines if the energy of an audio signal in a filter is below the noise threshold. Energy threshold determination component 236 included in noise reduction application 162 receives adjusted noise threshold 234 and the set of detected energy values 223 computed by signal energy detection component 222. Energy threshold determination component 236 evaluates each detected energy value 223-2 included in the set of detected energy values 223 with adjusted noise threshold 234. In some embodiments, when noise threshold configuration component 230 generates a set of adjusted noise thresholds 234, energy threshold determination component 236 may compare each detected energy value 223-2 with its corresponding adjusted noise threshold 234-2.

When energy threshold determination component 236 determines that detected energy value 223-2 is below adjusted noise threshold 234, energy threshold determination component 236 generates threshold indication 237 that corresponds to filtered signal 212-2. After energy threshold determination component 236 transmits threshold indication 237 to signal attenuation component 240, noise reduction application 162 proceeds to step 709. Otherwise, noise reduction application 162 proceeds to step 711, where noise reduction application 162 does not alter filtered signal 212-1 corresponding to a detected energy value 223-1 that is above adjusted noise threshold 234.

At step 709, noise reduction application 162 alters the filtered signal. Signal attenuation component 240 included in noise reduction application 162 receives threshold indication 237 from energy threshold determination component 236 that a particular filtered signal 212-2 has a detected energy value 233-2 below adjusted noise threshold 234. Signal attenuation component 240 responds to threshold indication 237 by altering the corresponding filtered signal 212-2. In some embodiments, signal attenuation component 240 may attenuate filtered signal by applying a filter to the signal in order to reduce the energy of filtered signal 212-2. Additionally or alternatively, signal attenuation component 240 may apply an attenuation factor to the filtered signal. For example, signal attenuation component 240 may multiply filtered signal 212-2 by zero so that the resultant attenuated filtered signal 242 has no energy. In another example, signal attenuation component 240 may multiply filtered signal by a specific constant (e.g., 0.25) to lower the energy level of filtered signal 212-2 by a constant value.

At step 713, noise reduction application 162 combines the filtered audio signal. Signal combiner component 250 included in noise reduction application 162 receives a subset of unaltered filtered signals 212 from audio filtering component 210 and a subset of attenuated filtered signals 242 from signal attenuation component 240. Signal combiner component 250 combines the subsets of filtered signals 212, 242 in order to synthesize output audio signal 140. For example, signal combiner component 250 can synthesize filtered signals 212, 242 such that output audio signal 140 includes the complete audio spectrum for a given time. In some embodiments, one or more filtered signals 212, 242 have overlapping frequency ranges. In such instances, signal combiner component 250 could, for a specific overlapping frequency range, select the filtered signal 212, 242 that has the highest detected energy. Additionally or alternatively, signal combiner component 250 may select unaltered filtered signal 212 in lieu of attenuated filtered signal 242.

In sum, a noise reduction system receives an input audio signal and decomposes portions of the audio signal, generating a set of filtered signals. In some embodiments, the noise reduction system may employ a filter bank used to process the audio signal for speech, such as a band of mel filters. The noise reduction system detects a set of signal energies associated with each of the filtered signals. The noise reduction system compares the set of detected signal energies of neighboring filtered signals to compute a set of energy differences. The noise reduction system modifies a noise threshold based on at least one of the computed energy differences. In some embodiments, the noise reduction system first determines the largest energy difference between any neighboring filtered signals, and then increases an initial noise threshold based on the largest energy difference to produce an adjusted noise threshold.

The noise reduction system compares the set of detected signal energies to the adjusted noise threshold. Based on the comparison, the noise reduction system alters a filtered signal corresponding to the detected signal energy. In some embodiments, the noise reduction system attenuates a filtered signal when the detected energy for the filtered signal is below the adjusted noise threshold. The noise reduction system combines the set of signals, including the one or more attenuated filtered signals, to synthesize an output audio signal.

At least one technological advantage of the disclosed techniques is that the noise reduction system can reduce noise elements included in an audio signal using the one or more filters that are also used by other audio processing systems. The noise reduction system can thus effectively remove noise elements from the audio signal such that other audio processing systems can more efficiently process the audio signal without degrading other portions of the audio signal.

1. In some embodiments, a method for reducing noise in an audio signal comprises decomposing a first input audio signal into a first set of sub-band signals, detecting a first set of signal energy values, wherein each signal energy value included in the first set of signal energy values is associated with a sub-band signal included in the first set of sub-band signals, generating a first noise reduction threshold based on at least one sub-band signal included in the first set of sub-band signals, for each sub-band signal included in the first set of sub-band signals, comparing the signal energy value associated with the sub-band signal to the first noise reduction threshold, based on determining that at least one sub-band signal included in the first set of sub-band signals is associated with a signal energy value that is below the first noise reduction threshold, attenuating the at least one sub-band signal to generate a first set of attenuated sub-band signals, and combining at least one sub-band signal included in the first set of sub-band signals with at least one attenuated sub-band signal included in the first set of attenuated sub-band signals to generate an output audio signal.

2. The method of clause 1, further comprising determining at least a first energy difference between two signal energy values included in the first set of signal energy values, wherein generating the first noise reduction threshold based on the at least one sub-band signal comprises generating the first noise reduction threshold based on the first energy difference.

3. The method of clause 1 or 2, wherein generating the first noise reduction threshold based on the first energy difference comprises combining the first energy difference with an initial noise reduction threshold.

4. The method of any of clauses 1-3, wherein generating the first noise reduction threshold comprises comparing pairs of signal energy values from the first set of signal energy values, wherein each pair of signal energy values are associated with sub-band signals that are included in the first set of sub-band signals and are generated by neighboring filters, for each comparison, computing an energy difference, wherein each energy difference is included in a first set of energy differences, and selecting, from the first set of energy differences, a largest energy difference, wherein the first noise reduction threshold is based on the largest energy difference.

5. The method of any of clauses 1-4, further comprising for each sub-band signal included in the first set of sub-band signals, generating an initial noise reduction threshold associated with the sub-band signal, for each initial noise reduction threshold, generating an adjusted noise reduction threshold associated with the sub-band signal, wherein the adjusted noise reduction threshold is based on the initial noise reduction threshold and at least a first energy difference between two signal energy values included in the first set of signal energy values, for each sub-band signal included in the first set of sub-band signals, comparing the signal energy value associated with the sub-band signal to the adjusted noise reduction threshold associated with the sub-band signal, and based on determining that at least one sub-band signal included in the first set of sub-band signals is associated with a signal energy value that is below an adjusted noise reduction threshold associated with the at least one sub-band signal, attenuating the at least one sub-band signal to generate a first set of attenuated sub-band signals.

6. The method of any of clauses 1-5, further comprising receiving an initial input signal, wherein the initial input signal is a continuous time-domain audio signal, and transforming the initial input signal to generate the first audio input signal, wherein the first audio input signal is a frequency-domain representation of the initial input signal.

7. The method of any of clauses 1-6, wherein a first signal energy value included in the first set of signal energy values is a root-mean-square (RMS) value of a first sub-band signal.

8. The method of any of clauses 1-7, wherein decomposing the first input audio signal into the first set of sub-band signals comprises decomposing the first input audio signal with a first filter bank, wherein at least a subset of filters included in the first filter bank overlap.

9. The method of any of clauses 1-8, further comprising for each sub-band signal included in the first set of sub-band signals, associating a time constant with the sub-band signal, and determining the signal energy value associated with the sub-band signal based on the associated time constant.

10. In some embodiments, a noise reduction system comprises a memory, and a processor coupled to the memory, wherein the processor is configured to decompose, via a first filter bank, a first input audio signal into a first set of sub-band signals, detect a first set of signal energy values, wherein each signal energy value included in the first set of signal energy values is associated with a sub-band signal included in the first set of sub-band signals, generate a first noise reduction threshold based on at least one sub-band signal included in the first set of sub-band signals, for each sub-band signal included in the first set of sub-band signals, comparing the signal energy value associated with the sub-band signal to the first noise reduction threshold, based on determining that at least one sub-band signal included in the first set of sub-band signals is associated with a signal energy value that is below the first noise reduction threshold, attenuating the at least one sub-band signal to generate a first set of attenuated sub-band signals, and combine, via at least one of the first filter bank or a second filter bank, at least one sub-band signal included in the first set of sub-band signals with at least one attenuated sub-band signal included in the first set of attenuated sub-band signals to generate an output audio signal.

11. The noise reduction system of clause 10, wherein at least one of the first filter bank or the second filter bank includes a first set of mel filters.

12. The noise reduction system of clause 10 or 11, wherein the processor is further configured to transmit the output audio signal to a speech recognition system, wherein the speech recognition system uses the first filter bank.

13. The noise reduction system of any of clauses 10-12, wherein the processor is further configured to receive a first set of mel-frequency cepstral coefficients (MFCCs), and modify the first set of mel filters based on the first set of MFCCs.

14. The noise reduction system of any of clauses 10-13, wherein the processor is further configured to receive, from a speech recognition system, a first set of mel-frequency cepstral coefficients (MFCCs), wherein the speech recognition system uses the first filter bank configured with the first set of MFCCs, modify the first set of mel filters based on the first set of MFCCs, transmit the output audio signal to the speech recognition system, wherein the speech recognition system extracts a set of features from the output audio signal.

15. The noise reduction system of any of clauses 10-14, wherein the processor is further configured to determine at least a first energy difference between two signal energy values included in the first set of signal energy values, wherein the processor is configured to generate the first noise reduction threshold based on the at least one sub-band signal by generating the first noise reduction threshold based on the first energy difference.

16. The noise reduction system of any of clauses 10-15, wherein the processor is configured to generate the first noise reduction threshold based on the first energy difference by combining the first energy difference with an initial noise reduction threshold.

17. The noise reduction system of any of clauses 10-16, wherein the processor is configured to generate the first noise reduction threshold by comparing pairs of signal energy values from the first set of signal energy values, wherein each pair of signal energy values are associated with sub-band signals that are included in the first set of sub-band signals and are generated by neighboring filters included in the first filter bank, for each comparison, computing an energy difference, wherein each energy difference is included in a first set of energy differences, and selecting, from the first set of energy differences, a largest energy difference, wherein the first noise reduction threshold is based on the largest energy difference.

18. In some embodiments, one or more non-transitory computer-readable media comprise instructions that, when executed by one or more processors, cause the one or more processors to perform the steps of decomposing a first input audio signal into a first set of sub-band signals, detecting a first set of signal energy values, wherein each signal energy value included in the first set of signal energy values is associated with a sub-band signal included in the first set of sub-band signals, for each sub-band signal included in the first set of sub-band signals, generating an initial noise reduction threshold associated with the sub-band signal, for each initial noise reduction threshold, generating an adjusted noise reduction threshold associated with the sub-band signal, wherein the adjusted noise reduction threshold is based on the initial noise reduction threshold and at least a first energy difference between two signal energy values included in the first set of signal energy values, for each sub-band signal included in the first set of sub-band signals, comparing the signal energy value associated with the sub-band signal to the adjusted noise reduction threshold associated with the sub-band signal, and based on determining that at least one sub-band signal included in the first set of sub-band signals is associated with a signal energy value that is below an adjusted noise reduction threshold associated with the at least one sub-band signal, attenuating the at least one sub-band signal to generate a first set of attenuated sub-band signals, and combining at least one sub-band signal included in the first set of sub-band signals with at least one attenuated sub-band signal included in the first set of attenuated sub-band signals to generate an output audio signal.

19. The one or more non-transitory computer-readable media of clause 18, further comprising instructions that, when executed by the one or more processors, cause the one or more processors to perform the steps of comparing pairs of signal energy values from the first set of signal energy values, wherein each pair of signal energy values are associated with sub-band signals that are included in the first set of sub-band signals and are generated by neighboring filters, for each comparison, computing an energy difference, wherein each energy difference is included in a first set of energy differences, and selecting, from the first set of energy differences, a largest energy difference, wherein the first energy difference is based on the largest energy difference.

20. The one or more non-transitory computer-readable media of clause 18 or 19, wherein the neighboring filters are mel filters included in a first filter bank.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for reducing noise in an audio signal, the method comprising:
    decomposing a first input audio signal into a first set of sub-band signals;
    detecting a first set of signal energy values, wherein each signal energy value included in the first set of signal energy values is associated with a sub-band signal included in the first set of sub-band signals,
    adjusting, based on at least two signal energy values associated with different sub-bands included in the first set of signal energy values, an initial noise reduction threshold to generate a first noise reduction threshold;
    for each sub-band signal included in the first set of sub-band signals, comparing the signal energy value associated with the sub-band signal to the first noise reduction threshold;
    based on determining that at least one sub-band signal included in the first set of sub-band signals is associated with a signal energy value that is below the first noise reduction threshold, attenuating the at least one sub-band signal to generate a first set of attenuated sub-band signals; and
    combining at least one sub-band signal included in the first set of sub-band signals with at least one attenuated sub-band signal included in the first set of attenuated sub-band signals to generate an output audio signal.

2. The method of claim 1, further comprising:
    determining at least a first energy difference between two signal energy values included in the first set of signal energy values,
    wherein adjusting the initial noise reduction threshold based on the at least one sub-band signal comprises generating the first noise reduction threshold based on the first energy difference.

3. The method of claim 2, adjusting the initial noise reduction threshold based on the first energy difference comprises combining the first energy difference with the initial noise reduction threshold.

4. The method of claim 1, wherein adjusting the initial noise reduction threshold comprises:
    comparing pairs of signal energy values from the first set of signal energy values, wherein each pair of signal energy values are associated with sub-band signals that are included in the first set of sub-band signals and are generated by neighboring filters;
    for each comparison, computing an energy difference, wherein each energy difference is included in a first set of energy differences; and
    selecting, from the first set of energy differences, a largest energy difference, wherein the first noise reduction threshold is based on the largest energy difference.

5. The method of claim 1, further comprising:
    for each sub-band signal included in the first set of sub-band signals, generating the initial noise reduction threshold associated with the sub-band signal;
    for each initial noise reduction threshold, generating an adjusted noise reduction threshold associated with the sub-band signal, wherein the adjusted noise reduction threshold is based on the initial noise reduction threshold and at least a first energy difference between two signal energy values included in the first set of signal energy values,
    for each sub-band signal included in the first set of sub-band signals, comparing the signal energy value associated with the sub-band signal to the adjusted noise reduction threshold associated with the sub-band signal; and
    based on determining that at least one sub-band signal included in the first set of sub-band signals is associated with a signal energy value that is below an adjusted noise reduction threshold associated with the at least one sub-band signal, attenuating the at least one sub-band signal to generate the first set of attenuated sub-band signals.

6. The method of claim 1, further comprising:
    receiving an initial input signal, wherein the initial input signal is a continuous time-domain audio signal; and
    transforming the initial input signal to generate the first audio input signal, wherein the first audio input signal is a frequency-domain representation of the initial input signal.

7. The method of claim 1, wherein a first signal energy value included in the first set of signal energy values is a root-mean-square (RMS) value of a first sub-band signal.

8. The method of claim 1, wherein decomposing the first input audio signal into the first set of sub-band signals comprises decomposing the first input audio signal with a first filter bank, wherein at least a subset of filters included in the first filter bank overlap.

9. The method of claim 1, further comprising:
    for each sub-band signal included in the first set of sub-band signals, associating a time constant with the sub-band signal, and
    determining the signal energy value associated with the sub-band signal based on the associated time constant.

10. A noise reduction system, comprising:
    a memory storing a noise reduction application; and
    a processor coupled to the memory, wherein the processor executes the noise reduction application by performing the steps of:
        decomposing, via a first filter bank, a first input audio signal into a first set of sub-band signals;
        detecting a first set of signal energy values, wherein each signal energy value included in the first set of signal energy values is associated with a sub-band signal included in the first set of sub-band signals,
        adjusting, based on at least two signal energy values associated with different sub-bands included in the first set of signal energy values, an initial noise reduction threshold to generate a first noise reduction threshold;

for each sub-band signal included in the first set of sub-band signals, comparing the signal energy value associated with the sub-band signal to the first noise reduction threshold;

based on determining that at least one sub-band signal included in the first set of sub-band signals is associated with a signal energy value that is below the first noise reduction threshold, attenuating the at least one sub-band signal to generate a first set of attenuated sub-band signals; and combining, via at least one of the first filter bank or a second filter bank, at least one sub-band signal included in the first set of sub-band signals with at least one attenuated sub-band signal included in the first set of attenuated sub-band signals to generate an output audio signal.

11. The noise reduction system of claim 10, wherein at least one of the first filter bank or the second filter bank includes a first set of mel filters.

12. The noise reduction system of claim 11, wherein the processor further performs the step of transmitting the output audio signal to a speech recognition system, wherein the speech recognition system uses the first filter bank.

13. The noise reduction system of claim 11, wherein the processor further performs the steps of:
receiving a first set of mel-frequency cepstral coefficients (MFCCs); and
modifying the first set of mel filters based on the first set of MFCCs.

14. The noise reduction system of claim 11, wherein the processor further performs the steps of:
receiving, from a speech recognition system, a first set of mel-frequency cepstral coefficients (MFCCs), wherein the speech recognition system uses the first filter bank configured with the first set of MFCCs;
modifying the first set of mel filters based on the first set of MFCCs; and
transmitting the output audio signal to the speech recognition system, wherein the speech recognition system extracts a set of features from the output audio signal.

15. The noise reduction system of claim 10, wherein:
the processor further performs the step of determining at least a first energy difference between two signal energy values included in the first set of signal energy values, and
adjusting the initial noise reduction threshold based on the at least one sub-band signal comprises generating the first noise reduction threshold based on the first energy difference.

16. The noise reduction system of claim 15, wherein the processor adjusts the initial noise reduction threshold based on the first energy difference by combining the first energy difference with the initial noise reduction threshold.

17. The noise reduction system of claim 10, wherein the processor adjusts the initial noise reduction threshold by:
comparing pairs of signal energy values from the first set of signal energy values, wherein each pair of signal energy values are associated with sub-band signals that are included in the first set of sub-band signals and are generated by neighboring filters included in the first filter bank;

for each comparison, computing an energy difference, wherein each energy difference is included in a first set of energy differences; and
selecting, from the first set of energy differences, a largest energy difference, wherein the first noise reduction threshold is based on the largest energy difference.

18. One or more non-transitory computer-readable media comprising instructions that, when executed by one or more processors, cause the one or more processors to perform the steps of:
decomposing a first input audio signal into a first set of sub-band signals;
detecting a first set of signal energy values, wherein each signal energy value included in the first set of signal energy values is associated with a sub- band signal included in the first set of sub-band signals, for each sub-band signal included in the first set of sub-band signals, generating an initial noise reduction threshold associated with the sub-band signal;
for each initial noise reduction threshold, adjusting, based on at least a first energy difference between two signal energy values associated with different sub-bands included in the first set of signal energy values, the initial noise reduction threshold to generate an adjusted noise reduction threshold associated with the sub-band signal;
for each sub-band signal included in the first set of sub-band signals, comparing the signal energy value associated with the sub-band signal to the adjusted noise reduction threshold associated with the sub-band signal; and
based on determining that at least one sub-band signal included in the first set of sub-band signals is associated with a signal energy value that is below an adjusted noise reduction threshold associated with the at least one sub-band signal, attenuating the at least one sub-band signal to generate a first set of attenuated sub-band signals; and
combining at least one sub-band signal included in the first set of sub-band signals with at least one attenuated sub-band signal included in the first set of attenuated sub-band signals to generate an output audio signal.

19. The one or more non-transitory computer-readable media of claim 18, further comprising instructions that, when executed by the one or more processors, cause the one or more processors to perform the steps of:
comparing pairs of signal energy values from the first set of signal energy values, wherein each pair of signal energy values are associated with sub-band signals that are included in the first set of sub-band signals and are generated by neighboring filters;
for each comparison, computing an energy difference, wherein each energy difference is included in a first set of energy differences; and
selecting, from the first set of energy differences, a largest energy difference, wherein the first energy difference is based on the largest energy difference.

20. The one or more non-transitory computer-readable media of claim 19, wherein the neighboring filters are mel filters included in a first filter bank.

* * * * *